United States Patent Office 3,370,632
Patented Feb. 27, 1968

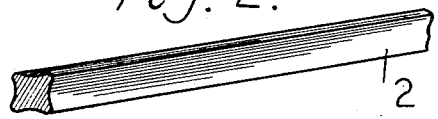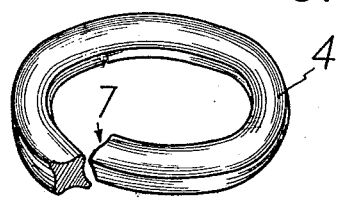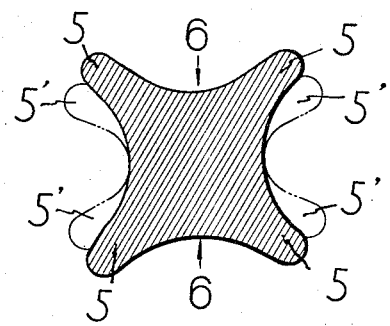

3,370,632
LOCKING WASHERS
Masaharu Kubokawa, 11–8, 3-chome Minami-Nagasaki,
Tashima-ku, Tokyo, Japan
Filed Dec. 7, 1965, Ser. No. 512,087
3 Claims. (Cl. 151—38)

ABSTRACT OF THE DISCLOSURE

A locking washer comprising an elastic metallic bar formed into a substantially circular ring shape, the bar having cut ends spaced adjacent and axially displaced from each other in its unstressed position, and the bar formed with four sides each defining substantially identical circular arcs in cross-section through the axis and curving centrally inwardly and forming together substantially outwardly oriented resilient angular corners.

---

The present invention relates to locking washers capable of replacing washers, plate springs, tooth locks, tongued washers and the like.

It is one object of the present invention to provide locking washers in which the method of manufacturing is very simple, mass-production of the same is possible with a lower cost of production, and locking washers thus manufactured are provided with a very effective and strong locking capability.

It is another object of the present invention to provide a locking washer comprising an elastic metallic bar formed into a substantially circular ring shape, the bar having cut ends spaced adjacent and axially displaced from each other in its unstressed position, and the bar formed with four sides each defining substantially identical circular arcs in cross-section through the axis and curving centrally inwardly and forming together substantially outwardly oriented resilient angular corners.

With the above and other objects in view which will become apparent in the following detailed description, the present invention will be clearly understood in connection with the accompanying drawings, in which:

FIGURE 1 is a perspective view of a blank, round wire, for use in the present invention;

FIG. 2 is a perspective view of the round wire blank which has been subjected to drawing, having a substantially X-shaped cross-section;

FIG. 3 is a side view illustrating the X-shaped blank wound up in coil form;

FIG. 4 is a perspective view of a locking washer, in accordance with the present invention produced by being cut at each turn of the coil, according to the method of this invention; and FIG. 5 is an enlarged cross-sectional view of the locking washer of the present invention.

Referring now to the drawing, a round wire blank 1 (FIG. 1), in accordance with the present invention, is first drawn through a die into a form, the cross-section thereof being substantially X-shaped (as shown in FIG. 2), then the drawn blank 2 is coiled with its upper and the lower central portions being as they are, and is next cut into the form of a circular ring 4 (FIG. 4) at each turn and then subjected to heat treating.

Referring to one embodiment of this invention, the round wire blank 1 is drawn into the form 2, the cross-section thereof being substantially X-shaped, and which further includes horizontal faces 6 (FIG. 6) at the centers of the upper and lower portions thereof. This X-shaped blank is then made into a coil 3 (FIG. 3) my means of a coil winding machine (not shown) and then the coil 3 is cut into a circular ring with the horizontal faces 6 thereof being formed at the upper and lower portions by each turn, the cut end portions thereof 7 not being aligned. After the circular ring is given a lead and then subjected to heat treating, there results the locking washer 4 shown in FIG. 4.

Washers made by the prior art have aligned lead and the cut portions thereof are opposed to each other by only frictional force thereof which acts as a locking force. Therefore, when such a frictional force is lost, elasticity, due to the lead being provided, acts as a locking force, resulting in a poor locking effect. However, when a locking washer, designed according to the present invention, is tightened by means of a nut with the washer being inserted into a pole which has a member being locked, then first of all a first locking action takes place in which the cut portions are tightened as far as they oppose each other. By further turning of the nut, the locking force of the washer becomes stronger due to the double edges of the washer and finally the washer with substantially outwardly oriented angular corners or tip edges 5, resistant against elasticity, are deformed as illustrated by the dashed lines in FIG. 5, providing a second locking action.

Further, as shown in FIG. 5, the four sides excepting the angular corners 5 of the washer are curved inwardly to form approximately identical circular arcs, the resiliency of the washer, as well as the returning force in relaxation of the applied pressure is remarkably strengthened by the curved surfaces. Each circular arc extends substantially all the way to the adjacent circular arcs of the adjacent sides and subtends an angle of about 90°, substantially forming the angular corners which are outwardly rounded, subtending an angle of about 180°.

When the nut is still further tightened, the horizontal faces 6 of the washer are forcibly pressed against the portion being tightened together with the above-described tightening forces. As the result, a washer which insures locking resistivity against vibrational impact which other conventional washers cannot offer can be obtained.

When the nut is loosened, the tip edges 5 are compressed within the limit of elasticity so that they return to their original shape by elasticity. The various locking nuts fail to effect a spring action to a portion being tightened, but the washer designed according to the present invention permits an ordinary and conventional nut to be utilized as a locking nut.

Furthermore, manufacturing the locking washers of the present invention is very simple and the cost of a washer made by the above-mentioned method is substantially the same as that of conventional washers so that the present invention is very useful.

While I have disclosed several embodiments of the present invention, it is to be understood that these embodiments are given by example only and not in a limiting sense, the scope of the present invention being determined by the objects and the claims.

What is claimed is:
1. A locking washer comprising
   an elastic metallic bar formed into a substantially circular ring shape,
   said bar having cut ends spaced adjacent and axially displaced from each other in its unstressed position, and
   said bar formed with four sides each defining substantially identical continuous circular arcs in cross-section through the axis and curving centrally inwardly and forming together substantially outwardly oriented resilient deformable corners, said circular arcs extending substantially to the outermost extremities of said corners, whereby adjacent arcs substantially intersect.

2. The locking washer, as set forth in claim 1, wherein said deformable corners are outwardly rounded connecting said adjacent circular arcs.

3. The locking washer, as set forth in claim 2, wherein said circular arcs subtend an angle of approximately 90° in said unstressed position, and said outwardly rounded corners subtend an angle of approximately 180° in said unstressed position.

References Cited
UNITED STATES PATENTS

| | | | |
|---|---|---|---|
| 493,213 | 3/1893 | Herman | 151—36 |
| 1,708,799 | 4/1929 | Norwood | 151—38 |
| 2,125,878 | 8/1938 | Beasley | 151—36 |

CARL W. TOMLIN, *Primary Examiner.*

R. S. BRITTS, *Assistant Examiner.*